Jan. 29, 1929.  
C. J. DOLL  
1,700,562  
ADJUSTABLE ECCENTRIC DRIVE FOR TRANSMISSIONS  
Filed Oct. 20, 1925  3 Sheets-Sheet 1

Inventor  
CLYDE J. DOLL  
By Ebenezer Talbert  
Attorney

Jan. 29, 1929.

C. J. DOLL 1,700,562

ADJUSTABLE ECCENTRIC DRIVE FOR TRANSMISSIONS

Filed Oct. 20, 1925   3 Sheets-Sheet 3

Inventor

CLYDE J. DOLL

By *J. Hume Talbot*

Attorney

Patented Jan. 29, 1929.

1,700,562

UNITED STATES PATENT OFFICE.

CLYDE J. DOLL, OF TRENTON, NEW JERSEY, ASSIGNOR TO EXCELLO TRANSMISSION COMPANY, OF CAMDEN, NEW JERSEY, A CORPORATION OF NEW JERSEY.

ADJUSTABLE ECCENTRIC DRIVE FOR TRANSMISSIONS.

Application filed October 20, 1925. Serial No. 63,682.

The object of the invention is to provide a transmission in which the speed ratio between the driving and driven elements may be varied manually to secure a desired speed for the load without any change of speed of the driven element.

With this object in view, the invention consists in a construction and combination of parts of which a preferred embodiment is illustrated in the accompanying drawings, wherein.

Figure 1:
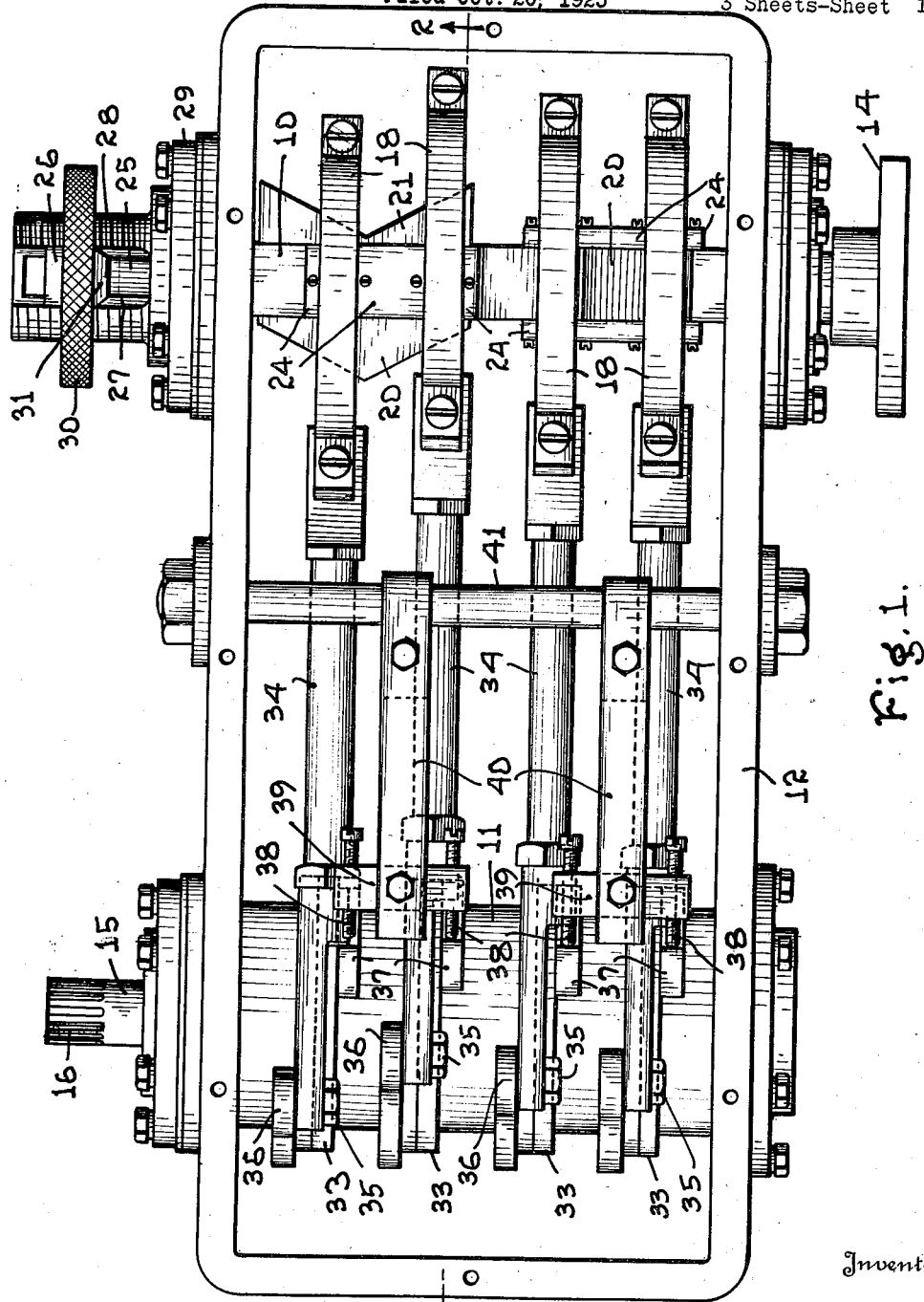
Figure 1 is a top plan view of a transmission embodying the invention, the cover, however, being omitted.
Figure 2:
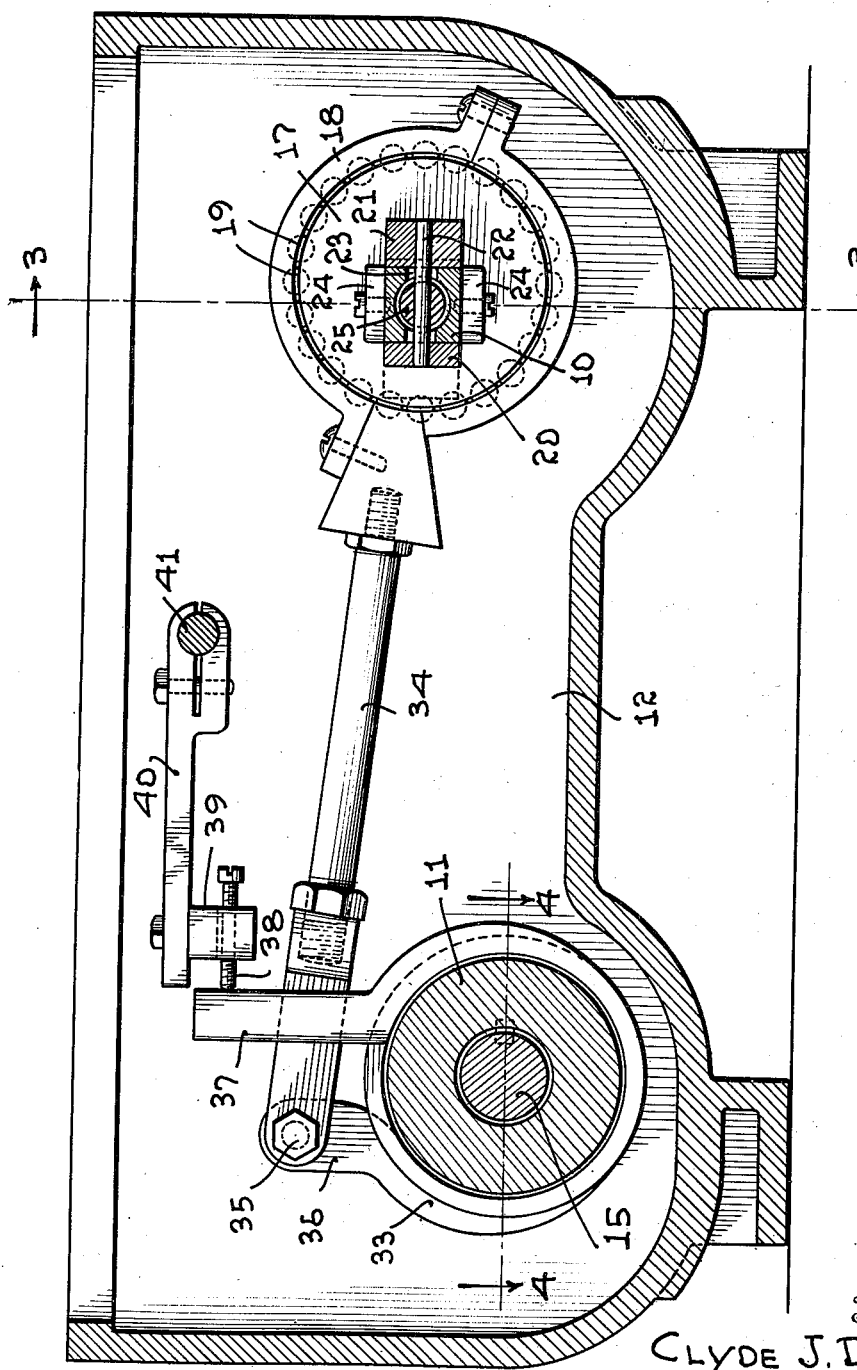
Figure 2 is a longitudinal sectional view on the plane indicated by the line 2—2 of Figure 1.
Figure 3:
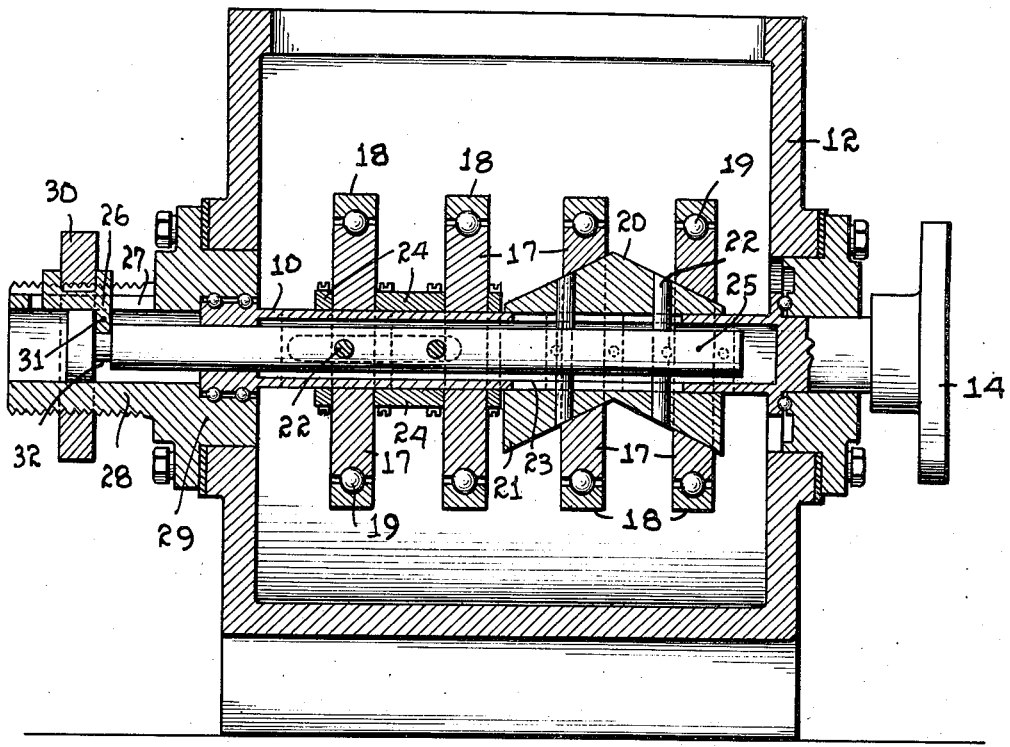
Figure 3 is a transverse sectional view on the plane indicated by the line 3—3 of Figure 2.

The driver 10 consisting of a shaft and the driven member 11 consisting of a drum are journalled in the opposite walls of a casing 12 constituting a housing for the two and are arranged with their axes parallel. The shaft 10 at one end and exterior to the housing or casing 12 is provided with a flange 14 for connection to a driving motor, while the drum, which is designed for connection to the load, is carried on a shaft 15 protruding from the casing on the opposite side from the flange 14 and is provided with a plurality of axial keyways 16 for positive connection with an element of the load to be driven.

A plurality of eccentrics 17 are carried by the shaft 10, being uniformly spaced along the latter and angularly spaced ninety degrees, being surrounded by eccentric straps 18 between which and the eccentrics are disposed antifriction bearings consisting of balls 19 disposed in raceways in the straps and similar raceways in the peripheries of the eccentrics. The eccentrics are operatively connected with the drum for rotating the latter, as hereinafter described, and the speed ratio between the drum and the shaft 10 is dependent upon the throw of the eccentrics. In order that this speed ratio may be varied, provision is made for changing the throw of the eccentrics by means of double inclined blocks 20 and 21 arranged in pairs with the pairs displaced ninety degrees and the units of each pair displaced one hundred and eighty degrees, so that the units of each pair occupy positions on diametrically opposite sides of the shaft 10.

The blocks 20 and 21 are connected by pins 22 passing diametrically through the shaft 10 through slots 23 in the shaft. The eccentrics are provided with openings or eyes of rectangular form with the edges of the remote ends inclined at angles corresponding with the angles of inclination of the engaging faces of the blocks 20 and 21. Since the blocks 20 and 21 are arranged in pairs and the units of each pair move together, movement axially of the shaft being possible due to the pins 22 engaging the slots 23, it is obvious that the throw of the connected eccentrics may be varied by such axial movement of the blocks, since the eccentrics are precluded from axial movement on the shaft by abutment blocks 24 secured to the shaft at points ninety degrees from the inclined blocks.

The spacing between the eccentrics is such that when one is disposed adjacent the peak of the block 20 and the crotch of the block 21, the other eccentric engaging that pair of blocks is at the remote end of the latter. Thus, these two eccentrics have the same throw but are disposed angularly one hundred and eighty degrees. In such a position of the blocks, the extreme throw of the eccentrics is had and the throw of the eccentrics may be reduced by the movement of the blocks 20 and 21 in the opposite direction until the eccentrics are disposed concentric with the shaft 10, when further movement of the blocks reverses the relation heretofore existing between the eccentrics until, when the blocks reach the limit of their movement in the opposite direction, the reversed relation of the eccentrics is obtained with the extreme throw of each. The two pairs of eccentrics are synchronized for operation so that the radial movement of one pair will be equal to but in a plane parallel with the other pair.

Actuation of the blocks 20 and 21 is had by means of a rod 25 entering the bore of the shaft 10 which is hollow. The pins 22 pass diametrically through this rod, so that any axial movement given to the rod with respect to the shaft results in corresponding movement being imparted to the blocks 20 and 21. Axial movement of the rod 25 may be had by any acceptable means, such as a hand lever or the like, but in the present embodiment is disclosed as a fork 26 carried at the extremity of the rod and traversing an axial slot 27 in a tubular extension 28 on the forward bearing 29 of the shaft 10. The fork 26 straddles the inner peripheral edge of an adjusting nut 30 threadingly engaged with the exterior threads on the tubular extension 28. The fork 26 is provided with an extension 31 engaging the slot 32 in the rod 25, so that rotary movement of the rod may take place as in the turning of the shaft 10 and yet the rod be axially moved by the shifting of the adjusting nut 30.

Rotary motion to the drum 11 is had from the eccentric 17, the drum carrying a plurality of clutch members 33 operatively connected with the eccentrics by connecting rods 34 which connect with the eccentric straps as shown. The clutch members 33 are of helical form, being made preferably of a steel rod coil, as shown to embrace the drum. The material of the clutch members is preferably spring steel and the movement between it and the drum is free so long as the two extremities of the member are not forced toward each other, under which condition the clutch member as a whole is diametrically contracted to effect a gripping action on the drum. The connecting rods 34 are pivotally connected to the clutch members, as at 35, on extensions 36 of the latter, the extensions 37 of the clutch member being disposed in obstructing relation with abutment screws 38 threaded through rocker blocks 39 carried at the remote ends of arms 40, these arms being supported in planes substantially parallel to the planes of the shaft 10 and drum 11 by a transverse bar 41 spanning the transmission casing. One rocker block 39 is provided for each pair of clutch members 33 and a supporting arm 40 provided for each rocker block.

As the shaft 10 rotates, reciprocatory movement is imparted to the connecting rods 34 through the eccentrics, which movement will tend to rock the clutch members 33 on the drum 11. For a portion of this rocking movement, however, the clutch members 33 are brought into gripping engagement with the drum but not all in unison. The adjusting screws 38 constitute the means in connection with the connecting rods for bringing the clutch members into gripping engagement with the drum, since they obstruct movement of the extensions 37 of the clutch members in one direction, thus permitting the movement imparted to the extensions 37 by the extension rods to diametrically contract the members and bring them into clamping or gripping engagement with the drum. Since the movement of the connecting rods in the one direction effects contraction of the clutch members, there is obviously no clutching action in the reverse direction and the clutch members slide freely over the drum but again take up the gripping action on the reverse movement of the connecting rods. The eccentrics being angularly displaced, one gripping member effects a gripping action during the interval of time that the others are inactive or just beginning or releasing their gripping action, and the rocker blocks 39 permit movement of the abutment screws so as to preclude gripping operation except at the appointed time in the actuation of the device.

The invention having been described, what is claimed as new and useful is:

1. A transmission comprising a driving member, a plurality of eccentrics carried by the driving member and angularly displaced uniformly therearound, double inclined blocks carried by the driving member and arranged in pairs disposed on diametrically opposite sides of the driving member, each pair of blocks being operatively connected with two of the eccentrics and the pairs having a uniform angular displacement on the driving member, the pairs of inclined blocks being axially movable of the driving member, and a single actuating means connected with the pairs of blocks for effecting axial movement of the same synchronously, said actuating means comprising an element enclosed by the driving member and having a fixed connection with each pair of blocks, said element extending beyond the driving member, a tubular member in surrounding relation to the extending part of said element and peripherally threaded, an adjusting nut engaged with the threads of said tubular member, the latter having an axial slot, and a fork slidably mounted in said slot and straddling the adjusting nut on the inner periphery and having an operative connection with said element to permit relative angular movement between it and the fork but preclude relative axial movement.

2. A transmission comprising a driving member, a plurality of eccentrics carried by the driving member and angularly displaced uniformly therearound, double inclined blocks carried by the driving member and arranged in pairs disposed on diametrically opposite sides of the driving member, each pair of blocks being operatively connected with two of the eccentrics and the pairs having a uniform angular displacement on the driving member, the pairs of inclined blocks being axially movable of the driving member, the driving member being of tubular form, a rod telescopically engaged in the driving member and provided with actuating means for effecting axial movement of the same relative to the driving member, and pins extending diametrically through said rod and connecting the double inclined blocks of each pair, said pins passing through axial slots formed in the driving member.

3. A transmission comprising a driving member, a plurality of eccentrics carried by the driving member and angularly displaced uniformly therearound, double inclined blocks carried by the driving member and arranged in pairs disposed on diametrically opposite sides of the driving member, each pair of blocks being operatively connected with two of the eccentrics and the pairs having a uniform angular displacement on the driving member, the pairs of inclined blocks being axially movable of the driving member, the driving member being of tubular form, a rod telescopically engaged in the driving member and provided with actuating means for effecting axial movement of the same relative to the driving member, pins extending diametrically through said rod and connecting the double inclined blocks of each pair, said pins passing through axial slots formed in the driving member, and abutment blocks secured to the driving member and engaging the eccentrics to prevent movement of them axially of the driving member, said abutment blocks for each pair of eccentrics having an angular displacement from the double inclined blocks connected with those eccentrics.

In testimony whereof he affixes his signature.

CLYDE J. DOLL.